US007207314B2

(12) United States Patent
Sakurai et al.

(10) Patent No.: US 7,207,314 B2
(45) Date of Patent: Apr. 24, 2007

(54) CONTROL CIRCUIT MODULE, INTAKE AIR PASSAGE BODY, ENGINE ELECTRONIC CONTROL DEVICE, AND ENGINE AIR INTAKE SYSTEM PROVIDED WITH THE SAME

(75) Inventors: Kohei Sakurai, Hitachi (JP); Minoru Ohsuga, Hitachinaka (JP); Nobuyasu Kanekawa, Hitachi (JP); Masatoshi Hoshino, Tsuchiura (JP); Atsushi Kanke, Hitachi (JP); Yutaka Nishimura, Hitachinaka (JP); Mitsuru Watabe, Urizura-machi (JP); Noriyoshi Urushiwara, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 111 days.

(21) Appl. No.: 11/171,263

(22) Filed: Jul. 1, 2005

(65) Prior Publication Data

US 2005/0252487 A1 Nov. 17, 2005

Related U.S. Application Data

(62) Division of application No. 10/255,702, filed on Sep. 27, 2002, now Pat. No. 7,047,939.

(30) Foreign Application Priority Data

Mar. 6, 2002 (JP) ............................ 2002-059888

(51) Int. Cl.
*F02M 69/48* (2006.01)
*G01F 1/68* (2006.01)

(52) U.S. Cl. ................ 123/399; 123/184.21; 123/337; 123/478; 123/647; 73/118.2

(58) Field of Classification Search ................ 123/399, 123/478, 361, 647, 184.21, 184.61, 195 E, 123/337; 73/118.2, 204.22
See application file for complete search history.

(56) References Cited

U.S. PATENT DOCUMENTS 4,304,128 A 12/1981 Hafner et al.
4,400,974 A 8/1983 Nishimura et al.

(Continued)

FOREIGN PATENT DOCUMENTS

JP 58-174145 A 10/1983

(Continued)

*Primary Examiner*—Hai Huynh
(74) *Attorney, Agent, or Firm*—Crowell & Moring LLP

(57) ABSTRACT

An engine electronic control unit is inserted through a through hole provided in an intake pipe and mounted in an intake air passage in a direction substantially perpendicularly with respect to a plane of the intake pipe forming the intake air passage. This unit is then secured to the intake pipe using a fixing flange provided at a connector portion. A fixing rail is protruded inside the intake pipe and leading edges of a metal base and a metal cover of the unit are inserted into this rail, thereby securing in position an end opposite to a side of the connector portion of the unit. This realizes an engine electronic control unit offering an outstanding heat radiation performance and vibration resistance, without having to provide special heat radiating parts or without involving an increase in an intake air resistance within the intake air passage. By using such an engine electronic control unit, it is possible to provide a low-cost, compact engine air intake system.

22 Claims, 12 Drawing Sheets

U.S. PATENT DOCUMENTS

| | | | |
|---|---|---|---|
| 4,561,302 | A | 12/1985 | Sumal et al. |
| 4,887,577 | A | 12/1989 | Arai et al. |
| 5,186,044 | A | 2/1993 | Igarashi et al. |
| 5,713,322 | A | 2/1998 | Mausner et al. |
| 5,771,850 | A | 6/1998 | Okada |
| 5,996,543 | A | 12/1999 | Nakayama et al. |
| 6,012,432 | A | 1/2000 | Igarashi et al. |
| 6,070,462 | A | 6/2000 | Igarashi et al. |
| 6,182,639 | B1 | 2/2001 | Igarashi et al. |
| 6,427,668 | B1 | 8/2002 | Igarashi et al. |
| 6,494,186 | B1 | 12/2002 | Wakeman |
| 6,510,735 | B2 | 1/2003 | Igarashi et al. |
| 6,513,479 | B2 | 2/2003 | Nozaki et al. |
| 6,598,472 | B2 | 7/2003 | Igarashi et al. |
| 6,622,555 | B2 | 9/2003 | Straight et al. |
| 6,725,715 | B2 | 4/2004 | Igarashi et al. |
| 2001/0045206 | A1 | 11/2001 | Smith et al. |

FOREIGN PATENT DOCUMENTS

| | | | |
|---|---|---|---|
| JP | 05-231899 | A | 9/1993 |
| JP | 07-083132 | A | 3/1995 |
| JP | 9-508954 | | 9/1997 |
| JP | 10-274111 | A | 10/1998 |

CONTROL CIRCUIT MODULE, INTAKE AIR PASSAGE BODY, ENGINE ELECTRONIC CONTROL DEVICE, AND ENGINE AIR INTAKE SYSTEM PROVIDED WITH THE SAME

This application is a DIVISIONAL application of Ser. No. 10/255,702, filed Sep. 27, 2002 now U.S. Pat. No. 7,047,939.

BACKGROUND OF THE INVENTION

1. Field of the Invention

This invention relates to an electronic control device for an engine of an automobile or other type of vehicle, what is called an engine control unit (hereinafter referred to as an ECU), and more specifically to a control circuit module that forms the ECU and an intake air passage body to which the control circuit module is mounted.

2. Prior Art (1) Japanese Patent Laid-open No. Sho 58-174145 discloses a technique in which the ECU is mounted on a side surface of an intake pipe. (2) Japanese Patent Laid-open No. Hei 9-508954 discloses a technique in which the ECU is mounted on an electronic control throttle body. (3) Japanese Patent Laid-open Nos. Hei 7-83132 and Hei 10-274111 disclose a technique in which the ECU is provided inside an air cleaner. Further, Japanese Patent Laid-open No. Hei 5-231899 discloses a technique in which heat generated from a bridge circuit and a control circuit including therein a detector element of an intake air flow rate measuring device is dissipated and transferred onto an intake air.

The arrangements of (1), (2), and (4) have a problem that heat generated from the ECU is not sufficiently dissipated. In the arrangement of (3), in which the ECU is provided inside the air cleaner and cooled by the intake air, ease of assembly is a major problem to be solved. In addition, since a circuit board size involved with the ECU is larger than the intake air flow rate measuring device, this presents another problem of an increased intake air resistance in an intake air passage when the ECU is provided inside the intake air passage.

SUMMARY OF THE INVENTION

It is an object of the present invention to provide a control circuit module offering a good heat radiating performance without substantially increasing intake air resistance in an intake air passage and an ECU mounted thereon with such a control circuit module.

It is another object of the present invention to provide a low-cost and compact engine air intake system and intake air passage body provided with such an ECU or control circuit module.

To achieve the foregoing objects, the following basic arrangements are provided for the invention.

1. A control circuit module mounted in an intake air passage is provided with a plurality of control circuit elements and a connector having a plurality of electric terminals, and at least one of the plurality of control circuit elements is electrically connected to a fuel injection valve of an internal combustion engine through some of the plurality of electric terminals.

2. A control circuit module mounted in an intake air passage is provided with a plurality of control circuit elements and a connector having a plurality of electric terminals, and at least one of the plurality of control circuit elements is electrically connected to an ignition device of an internal combustion engine through some of the plurality of electric terminals.

3. A control circuit module mounted in an intake air passage is provided with a plurality of control circuit elements and a connector having a plurality of electric terminals, and at least one of the plurality of control circuit elements is electrically connected to a throttle valve driving motor of an internal combustion engine through some of the plurality of electric terminals.

4. A control circuit module mounted in an intake air passage is provided with a plurality of control circuit elements and a connector having a plurality of electric terminals, and at least one of the plurality of control circuit elements is electrically connected to a fuel pump motor of an internal combustion engine through some of the plurality of electric terminals.

5. A control circuit module mounted in an intake air passage is provided with a plurality of control circuit elements and a connector having a plurality of electric terminals, and at least one of the plurality of control circuit elements is electrically connected to an external signal line through some of the plurality of electric terminals.

6. An intake air passage body forming an intake air passage is provided with electric terminals disposed on an outer wall surface thereof, some of the electric terminals are electrically connected to control actuators of an internal combustion engine, and some of the electric terminals are electrically connected to sensors that detect operating conditions of the internal combustion engine. Further, a metal plate is disposed inside the intake air passage body in a direction along a flow of air that runs therethrough, and a microprocessor is mounted on the metal plate. The microprocessor acquires signals from the sensors and provides the electric terminals with outputs of driving signals for the control actuators.

7. An intake air passage body forming an intake air passage is provided with electric terminals disposed on an outer wall surface thereof, and some of the electric terminals are electrically connected to a fuel injection valve of an internal combustion engine. Further, a metal plate is disposed inside the intake air passage body in a direction along a flow of air that runs therethrough, and an air flow rate detecting device and a microprocessor are mounted on the metal plate. The microprocessor acquires a signal from the air flow rate detecting device and provides the electric terminals with an output of a fuel injection valve driving signal.

8. An intake air passage body forming an intake air passage is provided with electric terminals disposed on an outer wall surface thereof, and some of the electric terminals are formed as electric terminals that receive a signal indicative of a crank angle, while some others of the electric terminals are formed as electric terminals that are electrically connected to an ignition device of an internal combustion engine. Further, a metal plate is disposed inside the intake air passage body in a direction along a flow of air that runs therethrough, and a microprocessor is mounted on the metal plate. The microprocessor acquires the crank angle signal and provides the electric terminals with an output of an ignition signal for the ignition device.

9. An intake air passage body forming an intake air passage is provided with electric terminals disposed on an outer wall surface thereof, and some of the electric terminals are formed as electric terminals that receive signals from sensors detecting operating conditions of an internal combustion engine and some others of the electric terminals are formed as electric terminals that are electrically connected to some of control devices of the internal combustion engine. Further, a metal plate is disposed inside the intake air passage body in a direction along a flow of air that runs therethrough. A microprocessor is mounted on the metal plate. The microprocessor acquires signals from the sensors and provides the electric terminals with outputs of control signals for the control devices of the internal combustion engine. The sensors include an accelerator opening sensor, and the control devices are assembled integrally with, or removably connected to, a motor-driven throttle valve device that controls the amount of air flowing through the intake air passage body in association with an output from the accelerator opening sensor.

10. Preferably, the metal is disposed in parallel with a rotating shaft of the throttle valve.

11. A control circuit module mounted in an intake air passage is provided with an air flow rate detecting device and a driver circuit for driving control devices of an internal combustion engine. The driver circuit is disposed on a downstream side of an air intake port of the air flow rate detecting device.

12. A control circuit module mounted in an intake air passage is provided with a resin molding connector portion secured to the intake air passage and a control circuit board secured on a metal plate disposed in the intake air passage. The metal plate is formed to extend in a direction along an air flow, being longer than a length, of the intake air passage, in a radial or circumferential direction. The resin molding connector portion is formed long, narrow along a longitudinal direction of the metal plate. A plurality of electric terminals disposed in proper alignment are molded inside the resin molding connector portion. An electric connection portion for connection between the electric terminals and the control circuit board is centralized at a joint between the metal plate and the resin molding connector portion.

13. Preferably, the resin molding connector portion includes at least two portions that are open to different directions.

14. An engine electronic control device according to one aspect of the present invention is provided with a circuit board on which a microprocessor that controls an engine of an automobile or the like, and circuit components of peripheral circuits of the microprocessor including an input/output interface circuit, an output driver circuit, and a power supply circuit are mounted. The circuit board is mounted in an intake air passage of an intake system that supplies each of engine cylinders with air by inserting the circuit board in a direction substantially perpendicularly with respect to a plane of the intake air passage forming the intake air passage.

The engine electronic control device is characterized more specifically in the following points.

15. In the engine electronic control device, a connector portion for connection to harnesses from various types of engine components is protruded to the outside of the intake air passage and the connector portion is secured to a member that forms part of the intake air passage. Further, the engine electronic control device is secured to a member that forms part of the intake air passage located at an end on a side of the intake air passage different from that on which the connector portion is formed.

16. The circuit board is secured to a metallic member in tight contact therewith and covered with a metallic cover. The metallic cover is secured to the metallic member in tight contact therewith so as to seal the inside of the engine ECU.

17. The circuit board is sealed with plastic molding. Further, a circuit board on which circuit components are mounted is secured also to the metallic cover in tight contact therewith, in addition to the metallic member to which the circuit board is secured, and the circuit board on the metallic member is electrically connected to the circuit board on the metallic cover.

18. To dispose the engine electronic control device by inserting it into the intake air passage, it is necessary that an area of the circuit board be made small. To implement this, the engine electronic control device according to the invention is characterized in that at least one circuit out of the input/output interface circuit, the output driver circuit, the power supply circuit, and a serial communications circuit is formed using an LSI chip.

19. An engine ECU according to another aspect of the invention is provided with a circuit board, on which a microprocessor for controlling an engine of a vehicle, and circuit components of peripheral circuit of the microprocessor including an input/output interface circuit, an output driver circuit, a power supply circuit, and a serial communications circuit are mounted. The circuit board is disposed in such a way as to be secured to an intake air passage, in tight contact therewith, of an intake system that supplies each of engine cylinders with air. A connector portion for connection to harnesses from various types of engine components is protruded to the outside of the intake air passage and the connector portion is secured to a member that forms part of the intake air passage.

20. Furthermore, the engine ECU as configured as described in the foregoing paragraphs is integrated with an intake air flow rate measuring device that measures a flow rate of an air flowing through the intake air passage or an electronic control throttle module that controls the flow rate of the air flowing through the intake air passage, thereby forming an intake module.

21. The invention is further characterized in that the engine ECU having the features as described in the foregoing paragraphs is mounted on an engine air intake system.

BRIEF DESCRIPTION OF THE DRAWINGS

Other objects and advantages of the invention will become apparent from the following description of embodiments with reference to the accompanying drawings in which.

DETAILED DESCRIPTION OF THE PREFERRED EMBODIMENTS

Figure 1:
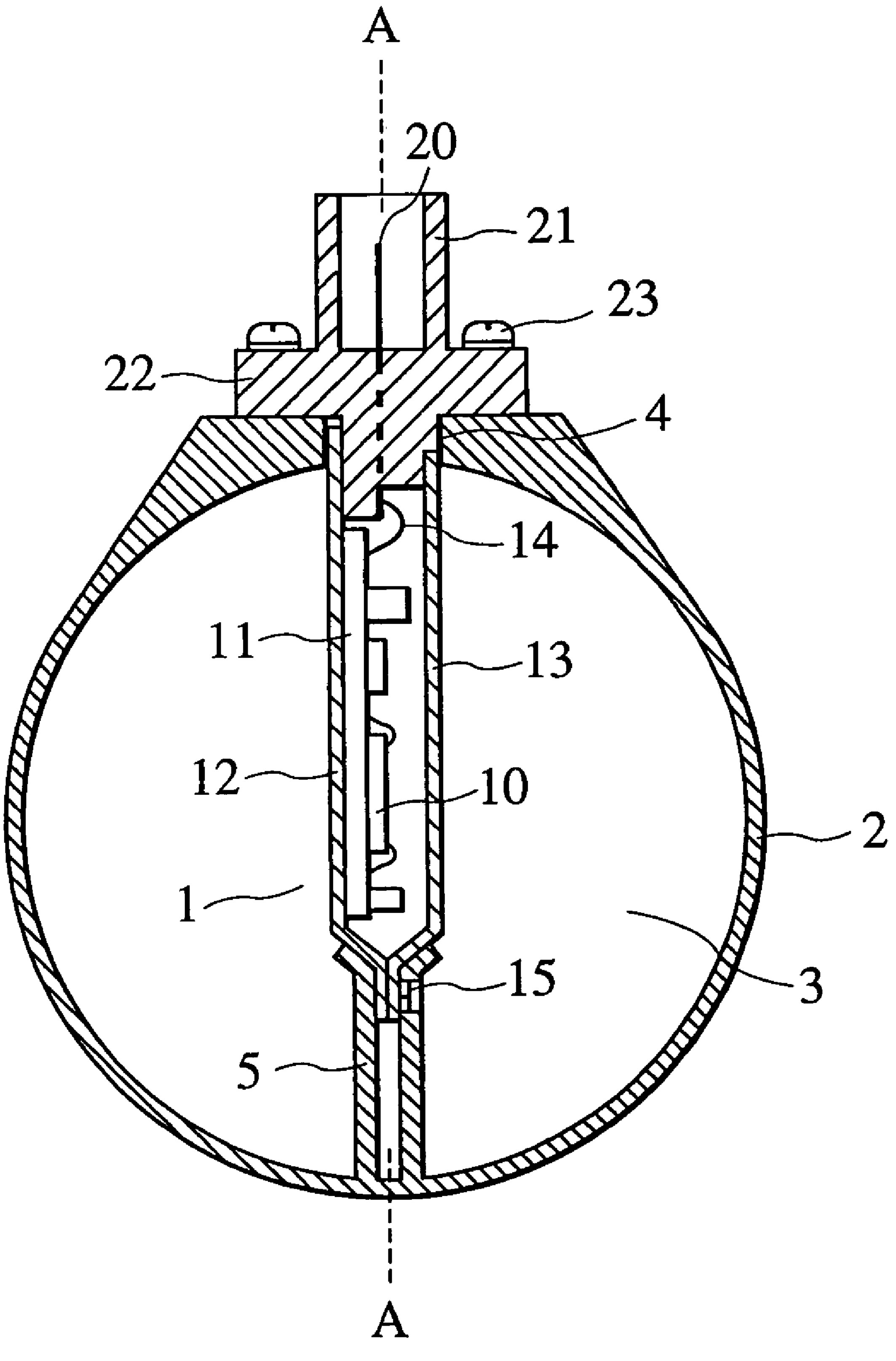
FIG. 1 is a cross-sectional view of an engine control unit according to a first embodiment of the invention.

Basic configurations of preferred embodiments according to the present invention will be described with reference to FIGS. 13 and 4.

1. A control circuit module (ECU1) mounted in an intake air passage 3 is provided with a plurality of control circuit elements (a microprocessor 30, an output driver 41, a power supply circuit 43, an intake air flow rate measuring device measuring circuit 67, and an electronic control throttle module control circuit 81) and a connector (a connector portion 21 and a fixing flange 22). The connector (the connector portion 21 and the fixing flange 22) is provided with a plurality of electric terminals (connector terminals 20). At least one of the plurality of control circuit elements (the microprocessor 30, the output driver 41, the power supply circuit 43, the intake air flow rate measuring device measuring circuit 67, and the electronic control throttle module control circuit 81) is electrically connected to a fuel injection valve (an injector 55) of an internal combustion engine through some of the plurality of electric terminals (connector terminals 20).

2. The control circuit module (ECU1) mounted in the intake air passage 3 is provided with the plurality of control circuit elements (the microprocessor 30, the output driver 41, the power supply circuit 43, the intake air flow rate measuring device measuring circuit 67, and the electronic control throttle module control circuit 81) and the connector (the connector portion 21 and the fixing flange 22). The connector (the connector portion 21 and the fixing flange 22) is provided with the plurality of electric terminals (connector terminals 20). At least one of the plurality of control circuit elements (the microprocessor 30, the output driver 41, the power supply circuit 43, the intake air flow rate measuring device measuring circuit 67, and the electronic control throttle module control circuit 81) is electrically connected to an ignition device (an igniter 56) of the internal combustion engine through some of the plurality of electric terminals (connector terminals 20).

3. The control circuit module (ECU1) mounted in the intake air passage 3 is provided with the plurality of control circuit elements (the microprocessor 30, the output driver 41, the power supply circuit 43, the intake air flow rate measuring device measuring circuit 67, and the electronic control throttle module control circuit 81) and the connector (the connector portion 21 and the fixing flange 22). The connector (the connector portion 21 and the fixing flange 22) is provided with the plurality of electric terminals (connector terminals 20). At least one of the plurality of control circuit elements (the microprocessor 30, the output driver 41, the power supply circuit 43, the intake air flow rate measuring device measuring circuit 67, and the electronic control throttle module control circuit 81) is electrically connected to a throttle valve driving motor (a DC motor 80) of the internal combustion engine through some of the plurality of electric terminals (connector terminals 20).

4. The control circuit module (ECU1) mounted in the intake air passage 3 is provided with the plurality of control circuit elements (the microprocessor 30, the output driver 41, the power supply circuit 43, the intake air flow rate measuring device measuring circuit 67, and the electronic control throttle module control circuit 81) and the connector (the connector portion 21 and the fixing flange 22). The connector (the connector portion 21 and the fixing flange 22) is provided with the plurality of electric terminals (connector terminals 20). At least one of the plurality of control circuit elements (the microprocessor 30, the output driver 41, the power supply circuit 43, the intake air flow rate measuring device measuring circuit 67, and the electronic control throttle module control circuit 81) is electrically connected to a fuel pump motor of the internal combustion engine through some of the plurality of electric terminals (connector terminals 20).

5. The control circuit module (ECU1) mounted in the intake air passage 3 is provided with the plurality of control circuit elements (the microprocessor 30, the output driver 41, the power supply circuit 43, the intake air flow rate measuring device measuring circuit 67, and the electronic control throttle module control circuit 81) and the connector (the connector portion 21 and the fixing flange 22). The connector (the connector portion 21 and the fixing flange 22) is provided with the plurality of electric terminals (connector terminals 20). At least one of the plurality of control circuit elements (the microprocessor 30, the output driver 41, the power supply circuit 43, the intake air flow rate measuring device measuring circuit 67, and the electronic control throttle module control circuit 81) is electrically connected to an external signal line (20X) through some of the plurality of electric terminals (connector terminals 20).

6. An intake air passage body (an intake pipe 2) that forms the intake air passage 3 is provided with the electric terminals (the connector terminals 20) on an outer wall surface thereof. Some of the electric terminals (the connector terminals 20) are electrically connected to control actuators (the injector 55, the igniter 56, a fuel pump 57, a warning lamp 58, and the throttle motor 80) of the internal combustion engine and some of the electric terminals (the connector terminals 20) are electrically connected to sensors (a crank angle sensor 52, a detonation sensor 53, an oxygen sensor 54, and a throttle opening sensor 79) that detect operating conditions of the internal combustion engine. The microprocessor 30 acquires signals from the sensors (the crank angle sensor 52, the detonation sensor 53, the oxygen sensor 54, and the throttle opening sensor 79) and provides the electric terminals (connector terminals 20) with outputs of driving signals for the control actuators (the injector 55, the igniter 56, the fuel pump 57, the warning lamp 58, and the throttle motor 80).

7. The intake air passage body (the intake pipe 2) that forms the intake air passage 3 is provided with the electric terminals (the connector terminals 20) on the outer wall surface thereof. Some (a connector terminal 20*a*) of the electric terminals (the connector terminals 20) are electrically connected to the fuel injection valve (the injector 55)

of the internal combustion engine. A metal plate (a metal base 12) is disposed, inside the intake air passage body (the intake pipe 2), in a direction along a flow of air that runs therethrough. The metal plate (the metal base 12) is provided with an air flow rate detecting device (an intake air flow rate measuring device 60) and the microprocessor 30 that acquires a signal from the air flow rate detecting device (the intake air flow rate measuring device 60) and provides the electric terminal (the connector terminal 20*a*) with an output of a fuel injection valve driving signal.

8. The intake air passage body (the intake pipe 2) that forms the intake air passage 3 is provided with the electric terminals (the connector terminals 20) on the outer wall surface thereof. Some of the electric terminals (the connector terminals 20) are formed as electric terminals (the connector terminal 20A) that receive a signal indicating a crank angle, while some others of the electric terminals (the connector terminals 20) are formed as electric terminals (the connector terminal 20*b*) that are electrically connected to the ignition device (the igniter 56) of the internal combustion engine. The metal plate (the metal base 12) is disposed, inside the intake air passage body (the intake pipe 2), in the direction along the flow of air that runs therethrough. The metal plate (the metal base 12) is provided with the microprocessor 30 that acquires the crank angle signal and provides the electric terminals (the connector terminal 20*b*) with an output of an ignition signal for the ignition device (the igniter 56).

9. The intake air passage body (the intake pipe 2) that forms the intake air passage 3 is provided with the electric terminals (the connector terminals 20) on the outer wall surface thereof. Some of the electric terminals (the connector terminals 20) are formed as electric terminals (the connector terminals 20) that receive signals from the sensors indicating the operating conditions of the internal combustion engine (the crank angle sensor 52, the detonation sensor 53, the oxygen sensor 54, and the throttle opening sensor 79). Some others of the electric terminals (the connector terminals 20) are formed as electric terminals (the connector terminals 20) that are electrically connected to some of control devices of the internal combustion engine. The metal plate is disposed, inside the intake air passage body (the intake pipe 2), in the direction along the flow of air that runs therethrough. The metal plate is provided with the microprocessor 30 that acquires signals from the sensors through the electric connectors (the connector terminal 20) and provides the electric terminals (the connector terminal 20) with outputs of control signals for the control devices of the internal combustion engine (the injector 55, the igniter 56, the fuel pump 57, the warning lamp 58, and the throttle motor 80). The sensors include an accelerator opening sensor (an accelerator sensor 51) and the control devices include a motor-driven throttle valve device (the throttle motor 80) that controls the amount of air flowing through the intake air passage body (the intake pipe 2) in association with a signal from the accelerator-opening sensor. The intake air passage body (the intake pipe 2) is assembled integrally with, or connected removably to, the motor-driven throttle valve device (the throttle motor 80).

10. Preferably, the metal plate (the metal base 12) is disposed in parallel with a rotating shaft of the throttle valve (a throttle shaft 72).

11. The control circuit module (ECU1) mounted in the intake air passage 3 is provided with the air flow rate detecting device (the intake air flow rate measuring device 60) and a driver circuit (the output driver 41, an output driver LSI 410, and the electronic control throttle module control circuit 81) for driving the control devices of the internal combustion engine (the injector 55, the igniter 56, the fuel pump 57, the warning lamp 58, and the throttle motor 80). The driver circuit (the output driver 41 and the output driver LSI 410) is disposed on a downstream side of an air intake port (a flow path 65) of the air flow rate detecting device (the intake air flow rate measuring device 60).

12. The control circuit module (ECU1) mounted in the intake air passage 3 is provided with a resin molding connector portion (the connector portion 21 and the fixing flange 22) secured to the intake air passage body (the intake pipe 2), the metal plate (the metal base 12) disposed in the intake air passage 3, and a control circuit board (a circuit board 11) secured on the metal plate (the metal base 12). The metal plate (the metal base 12) is formed to extend in the direction along the air flow, being longer than a radial length or a circumferential length of the intake air passage 3. The resin molding connector portion (the connector portion 21 and the fixing flange 22) is formed to be long narrow along a longitudinal direction. The plurality of electric terminals (the connector terminals 20) is disposed inside the resin molding connector portion (the connector portion 21 and the fixing flange 22) in proper alignment. An electric connection (a wire bonding connection 200) for connection to the electric terminals (the connector terminals 20) and the control circuit board (the circuit board 11) is centralized at a joint between the metal plate (the metal base 12) and the resin molding connector portion (the connector portion 21 and the fixing flange 22).

13. Preferably, the resin molding connector portion (the connector portion 21 and the fixing flange 22) is composed of at least two portions that are open to different directions (the connector portion 21 and a connector 74 for connection to the electronic control throttle module of the ECU).

The ECU and the automotive engine air intake system provided with the ECU according to the embodiments of the present invention will be described with reference to the accompanying drawings in the following.

Figure 2:
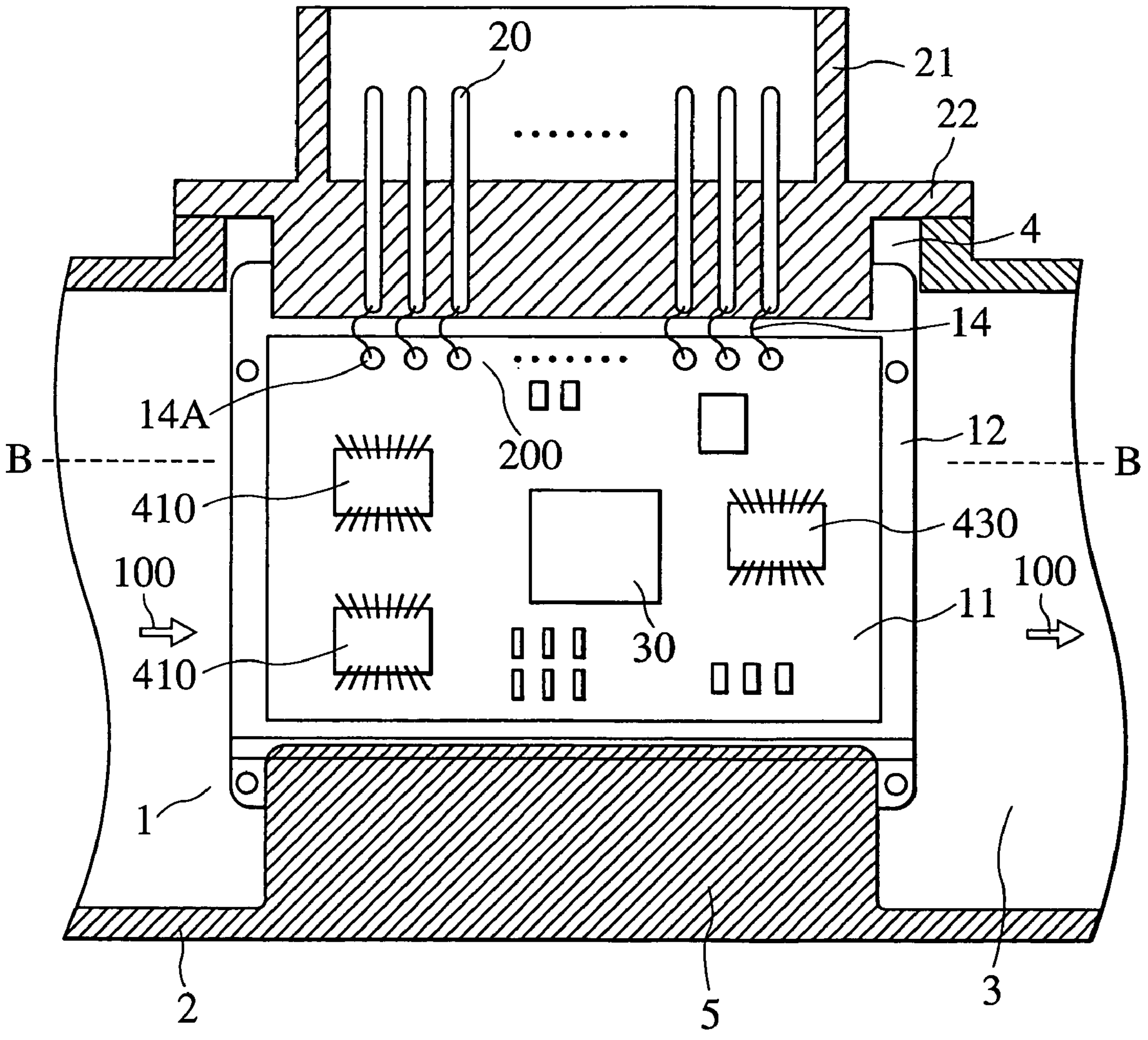
FIG. 2 is a cross-sectional view of the engine control unit of the first embodiment taken along the line A—A of FIG. 1.
Figure 3:
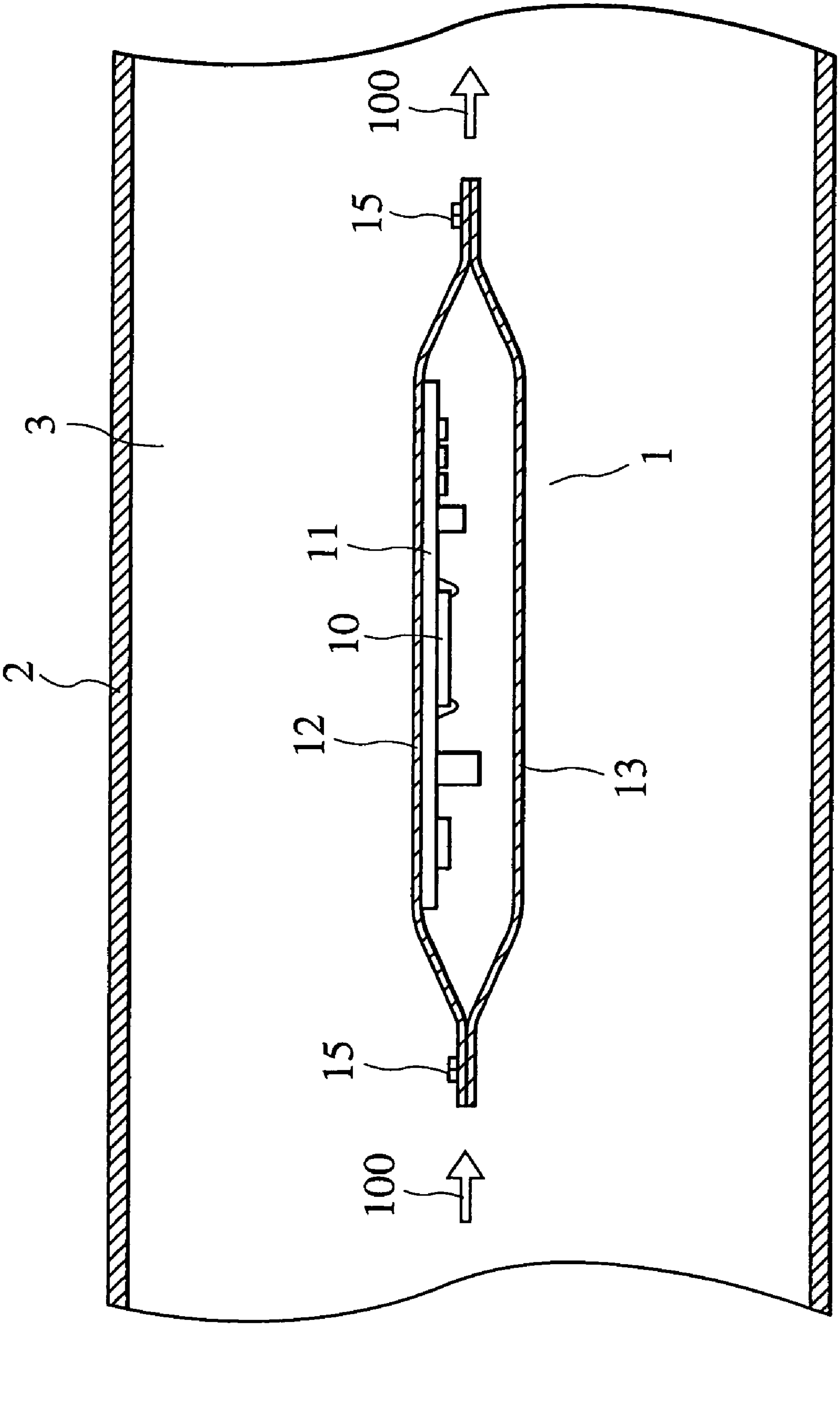
FIG. 3 is a cross-sectional view showing the first embodiment of the invention taken along the line B—B of FIG. 2.

FIGS. 1, 2, and 3 are schematic diagrams showing an ECU according to a first embodiment of the present invention. In accordance with the first embodiment of the invention, an engine ECU is mounted inside an intake pipe located downstream from an air cleaner housing of an air intake system.

FIG. 1 is a cross-sectional view of an intake pipe. Referring to FIG. 1, an ECU 1 is inserted in an intake air passage 3 through a through hole 4 provided in an intake pipe 2 in a direction substantially perpendicularly with respect to a plane of the intake pipe 2 forming the intake air passage 3.

Circuit operations will be explained with reference to a circuit block diagram shown in FIG. 4. That is, the ECU 1 provides an I/O 35 of a microprocessor 30 with inputs of signals from a crank angle sensor 52, a detonation sensor 53, an oxygen sensor 54, and the like by way of an input circuit 40. Based on these input signals, a CPU 31 of the microprocessor 30 performs arithmetic operations using a RAM 32 and the like in accordance with a control program previously stored in a ROM 33 and transmits optimum control signals to an output driver 41 by way of the I/O 35. The output driver 41 then drives an injector 55, an igniter 56, a fuel pump 57, a warning lamp 58, and other actuators.

In addition, the ECU 1 performs communications with other electronic control units through a communication interface 34 as a communication controller built into the microprocessor 30 and a serial communication circuit 42 as a transceiver. The ECU 1 is composed of, as described in the foregoing paragraphs, the microprocessor 30, the input circuit 40, the output driver 41, the serial communication circuit 42, a power supply circuit 43, and various other circuits and the circuit components are mounted on a circuit board.

Referring back to FIG. 1 again, a configuration of the ECU according to the first embodiment of the invention will be explained. Circuit components 10, such as LSIs constituting the engine ECU 1, are mounted on a circuit board 11 and circuits across the circuit board 11 and connector terminals 20 are electrically connected using metal wires 14, such as aluminum wires or gold wires. The circuit board 11 is bonded to a metallic base (a metal base 12) and, to prevent contamination with oil, gasoline, or the like and for waterproof, a metallic cover (a metal cover 13) is brought into tight contact with the metal base 12 using screws 15. Heat generated by a heat-generating power MOS transistor and the like among other circuit components 10 is dissipated from both surfaces of the metal base 12 and the metal cover 13 by way of the circuit board 11 into an intake air that flows through the intake air passage 3.

Though not shown in FIG. 1, a large number of fine recesses are provided in the surface of the metal base 12 and the metal cover 13, and/or a large number of protrusions are provided on the surfaces of the metal base 12 and the metal cover 13. This produces turbulence at boundaries of the recesses or protrusions with an air stream, which enhances a cooling effect.

The ECU 1 is provided with a fixing flange 22 at a connector portion 21, and is secured to the intake pipe 2 with screws 23. To reduce intake air resistance in a passage of the intake pipe 2, it is necessary to minimize as much as possible a cross-sectional area of the engine ECU 1 with respect to the intake air passage. It is therefore preferable that the length of the circuit board 10 in a diametric direction of the intake pipe be made short. It therefore becomes necessary, in the first embodiment of the invention, to secure an end opposite to the connector portion 21 of the ECU 1 in order to prevent the circuit board from being damaged by vibration because of the ECU 1 not reaching a bottom of the intake pipe. To accomplish this, a fixing rail 5 is protruded inside the intake pipe and leading edges of the metal base 12 and the metal cover 13 of the ECU 1 are fitted into the rail.

Figure 5:
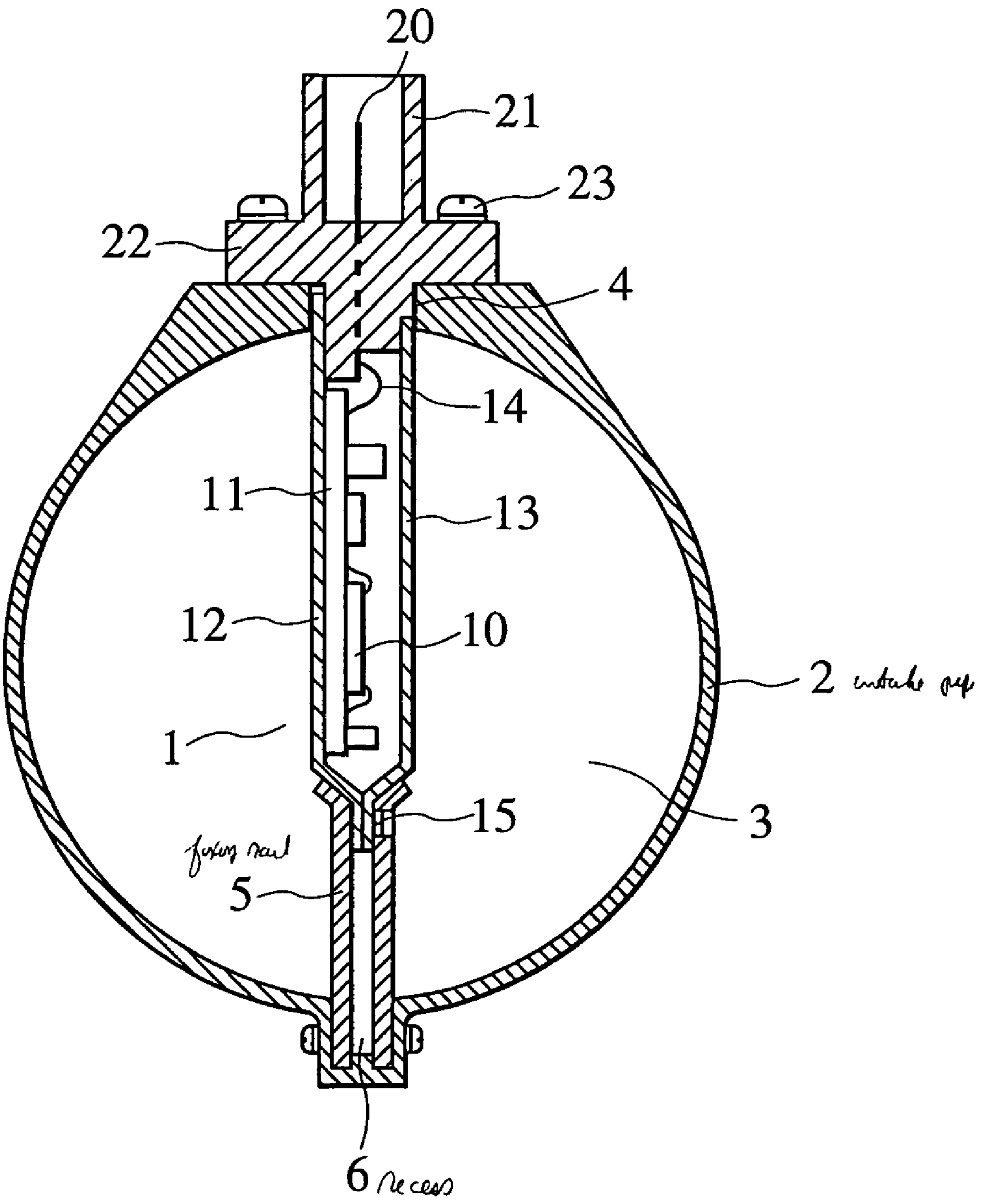
FIG. 5 is a cross-sectional view showing a fixing rail of the engine control device provided inside an intake pipe according to another embodiment of the invention.

FIG. 1 shows the first embodiment, in which the engine ECU is inserted in and secured to the intake pipe located at a position downstream from the air cleaner housing of the air intake system. The ECU may nonetheless be mounted to a wall surface of the air cleaner housing using the same method. A ceramic substrate is used for the circuit board 11; however, a glass epoxy substrate may be used for a cost reduction, if the scale of the circuit is small requiring a smaller number of circuit components (where a packaging density will be higher). Furthermore, in addition to wire bonding, a solder bump connection may be used as the method of connecting LSIs to the ceramic substrate. The fixing rail 5 inside the intake pipe may be molded integrally with the intake pipe 2 as shown in FIG. 1, or, referring to FIG. 5, a recess 6 is formed on a bottom of the intake pipe 2 and the fixing rail 5 is inserted into this recess and screwed together from the outside of the intake pipe.

FIG. 2 is a cross-sectional view showing the first embodiment of the invention taken along line A—A of FIG. 1, namely, a cross-sectional view showing the intake pipe in a longitudinal direction. The microprocessor 30, the output driver LSI 410, the power supply LSI 430 and the like are mounted on the circuit board 11. The microprocessor 30 is mounted through flip-chip bonding and the output driver LSI 410 and the power supply LSI 430 are mounted through wire bonding. Since both the output driver LSI 410 and the power supply LSI 430 generate a large amount of heat, they are located at a central portion in a diametric direction of the intake pipe, at which an intake air 100 flows at the fastest speed, thereby improving heat radiation efficiency.

Figure 6:
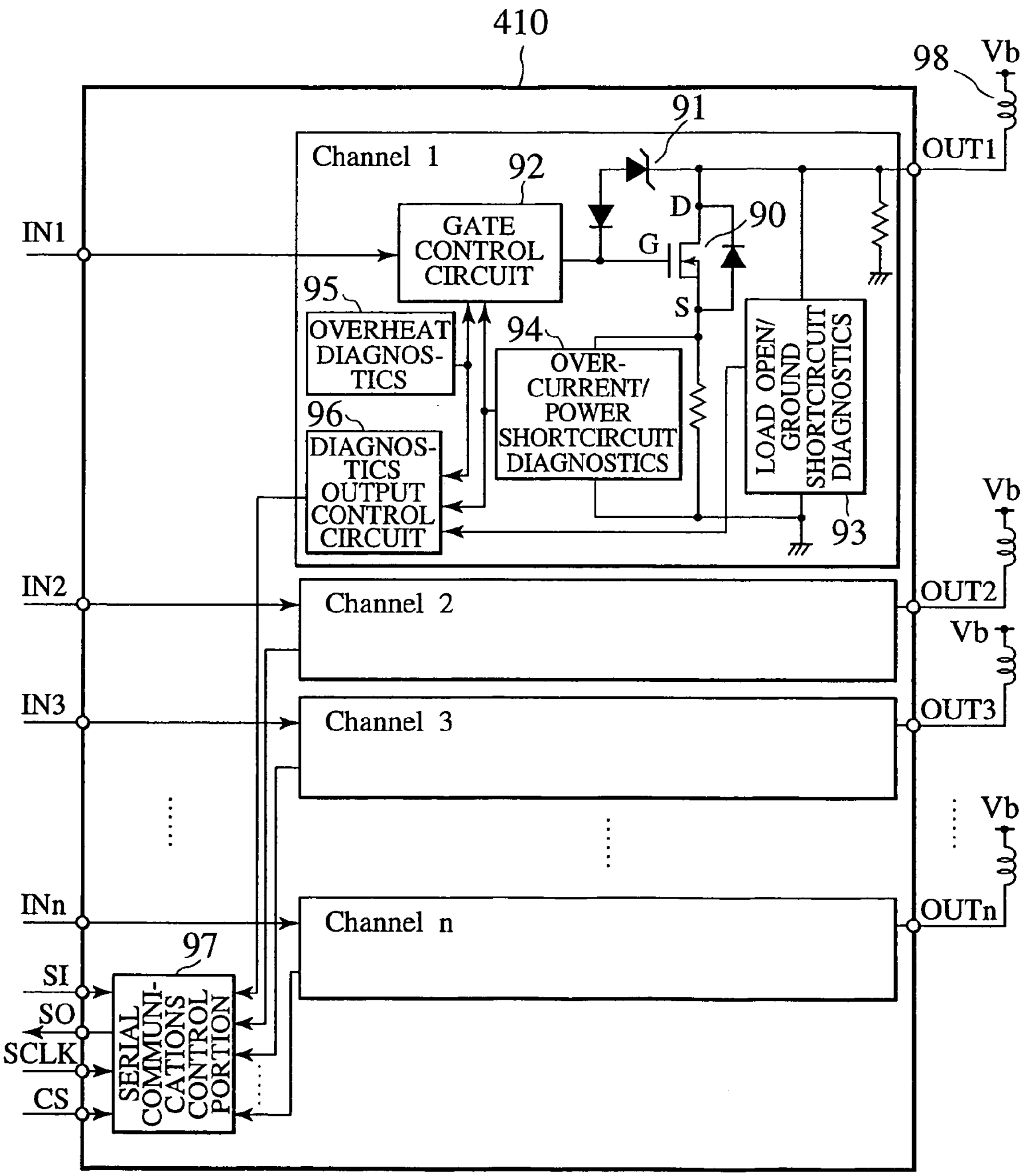
FIG. 6 is a circuit block diagram of an output driver LSI shown in FIG. 2.

As shown in the first embodiment, the use of LSIs, such as the output driver LSI 410 and the power supply LSI 430 helps make the circuit board area smaller, which is a basic requirement for making it possible to dispose the ECU inside the intake air passage. As one example of such LSIs, FIG. 6 is a circuit block diagram showing the output driver LSI 410. The output driver LSI 410 shown in FIG. 6 integrates on a single chip an N-type power MOS transistor 90 that drives various types of loads 98 including the injector and solenoid coils and n channels of a protective/diagnostics logic. The N-type MOS transistor 90 is turned ON or OFF by controlling a gate G thereof using a signal from the microprocessor, thereby driving the load 98 connected to a drain D thereof. When the gate is ON, a current of about several amperes flows through a circuit across a source and the drain and heat is generated by an ON resistance (about 0.2 □) as described earlier. A Zener diode 91 between the drain D and the gate G functions to prevent the MOS from being disrupted by a counterelectromotive force developed when the gate is OFF with an inductive load connected to the drain. The output driver LSI 410 shown in FIG. 6 is provided with a self-diagnostics circuit built therein, comprising a load-disconnection or drain D ground shortcircuit diagnostics circuit 93, an overcurrent or drain D power supply shortcircuit diagnostics circuit 94, and an overheat diagnostics circuit 95. When a faulty condition of any of these is detected, the output driver LSI 410 provides an output of a signal corresponding to the faulty condition for the microprocessor through a diagnostics output control circuit 96 and a serial communication control portion 97. Furthermore, when an overheat is detected or an overcurrent/power supply shortcircuit is detected, the output driver LSI 410 transfers a fault detection signal to a gate control circuit 92, thereby turning OFF the MOS transistor 90 and thus preventing the MOS transistor 90 from being broken.

FIG. 3 is a cross-sectional view showing the first embodiment of the invention taken along line B—B of FIG. 2. To prevent an intake air resistance from being increased because of a turbulence occurring in the flow of the intake air 100 as a result of the ECU 1 being inserted in the intake pipe, the metal base 12 and the metal cover 13 are both rounded so that an upstream side of the ECU 1 in the intake pipe or both the upstream side and a downstream side of the ECU 1 in the intake pipe are streamlined when the metal base 12 and the metal cover 13 of the ECU 1 are fastened together using the screws 15.

Effects that the first embodiment of the invention described in the foregoing produces will be explained.

First, since the ECU 1 is inserted in the intake air passage 3, the flow of the intake air having a temperature lower than the air outside the intake pipe 2 can be used to cool the ECU 1. This enhances heat radiation efficiency dramatically and, even if the ECU 1 is built compact, heat radiation is possible without needing to provide special heat radiating parts. Since not only the metal base, but also the metal cover of the ECU 1 are made of metal according to the first embodiment, it is possible to allow heat to radiate from both surfaces of the engine ECU 1, which further enhances heat radiation efficiency. In particular when the intake pipe is made of resin, it becomes hard to accomplish proper heat radiation in the conventional construction, in which the ECU 1 is placed outside the intake pipe 2. The arrangement of the engine ECU 1 according to the first embodiment of the invention is therefore obviously advantageous.

Second, since the ECU 1 is mounted downstream the air cleaner housing, the distance to the engine components to be controlled becomes shorter than when the ECU 1 is mounted on the air cleaner housing, it is possible to make the harness length shorter. It is also possible to build the overall air intake system compactly, because only connectors protrude from the intake pipe to the outside, and not the ECU main body.

Third, since the fixing rail is provided in the intake pipe so that the end opposite to the connector portion of the ECU can be secured in position, the circuit board can be prevented from being damaged due to engine vibrations. Furthermore, since this fixing rail is provided only on the bottom of the intake pipe, a construction excellent in terms of vibration resistance is achieved without allowing the intake air resistance to increase by a large margin.

Figure 7:
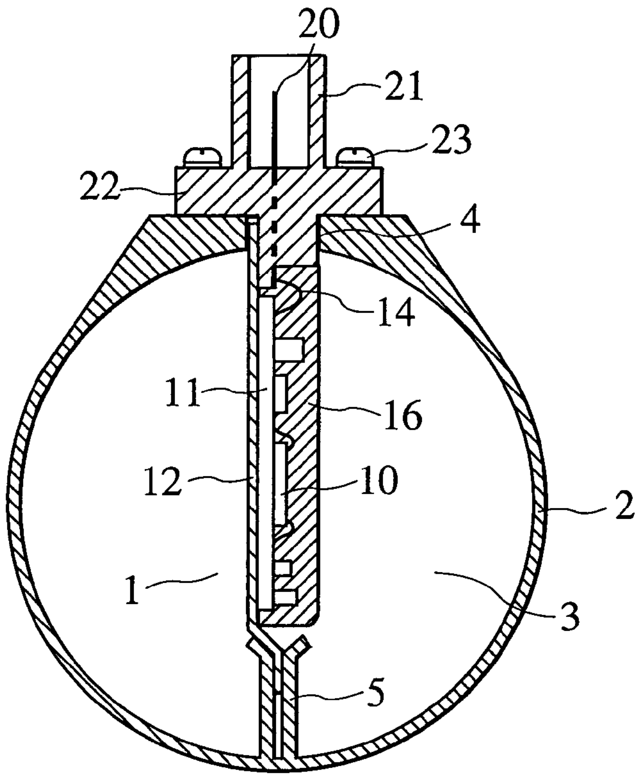
FIG. 7 is a cross-sectional view of an engine electronic control unit according to a second embodiment of the invention.

FIG. 7 is a schematic view of an ECU according to a second embodiment of the invention. According to the second embodiment, a high thermal conductivity resin 16 is molded to protect circuit components 10 mounted on a circuit board 11 instead of the metal cover 13 used in the first embodiment of the invention. The high thermal conductivity resin can be made by mixing a metallic or inorganic ceramics filler having a high thermal conductivity with a resin. Since no metal cover is used in the ECU according to the second embodiment, only a metal base 12 is inserted into a fixing rail 5 so that an end opposite to a connector portion 21 of the ECU 1 is secured in position.

Molding the ECU 1 with the high thermal conductivity resin allows heat generated from the circuit components to be dissipated not only from the side of the circuit board, but also to air flowing through the intake pipe passage by way of the high thermal conductivity resin.

Though not shown in FIG. 7, a large number of fine recesses are provided in a surface of the high thermal conductivity resin, and/or a large number of fine protrusions are provided on the surface of the high thermal conductivity, which produces turbulence in boundaries of the recesses or protrusions with an air stream, thereby enhancing a cooling effect.

In addition, since no screws are required for securing the metal cover and fastening the metal cover to the metal base, the number of parts required can be decreased.

Furthermore, if a high thermal conductivity resin, which is a mixture of a metallic or inorganic ceramics filler having a high thermal conductivity with a resin having itself a high thermal conductivity, is used, the engine ECU will exhibit even more excellent heat radiation performance. For the resin having itself a high thermal conductivity, it is desirable that an anisotropic structure unit have a covalent bond portion in resin components, the maximum diameter value of the anisotropic structure unit be 400 nm or more, and anisotropic structures contained in resin components account for 25 vol % or more.

An example of such a resin is one that uses 4-(oxilanylmethoxy) benzoic acid-4,4'-[1,8-octane-diyl-bis(oxy)] bisphenol-ester as an epoxy resin monomer and 4,4'-diaminodiphenylmethane as an epoxy resin hardener.

Figure 8:
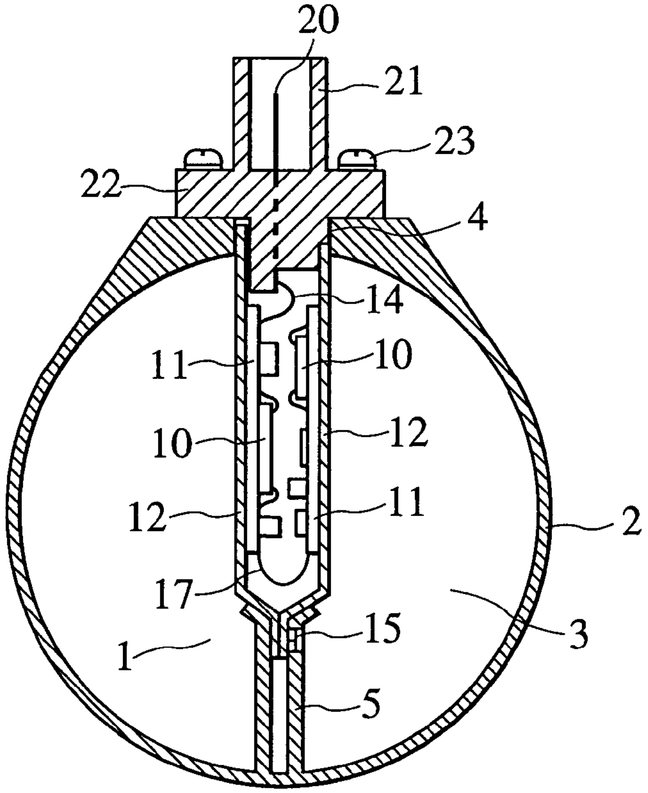
FIG. 8 is a cross-sectional view of an engine control unit according to a third embodiment of the invention.

FIG. 8 is a schematic view of an ECU according to a third embodiment of the invention. According to the third embodiment, a circuit board 11 on which circuit components 10 are mounted is divided into two, which are bonded with an adhesive to a metal base 12 and a metal cover 13, respectively. The two circuit boards are electrically connected to each other using, for example, a flexible board 17 made of resin. As shown in FIG. 8, a bare chip component is disposed at a position opposing a high circuit component, which helps reduce the thickness of the ECU 1 even with two circuit boards used therein.

According to the third embodiment, since the area, on which components are mounted, is increased by providing two sheets of circuit board, even a multifunctional ECU having thereon a large number of input and output points can be disposed inside the intake pipe. Though the multifunctional ECU generates an increased amount of heat because of the number of circuit components involved, the two boards are bonded to the metal plates, which reduces thermal resistance between the circuit components and the air flowing through the intake pipe passage, contributing to easy heat radiation.

Figure 9:
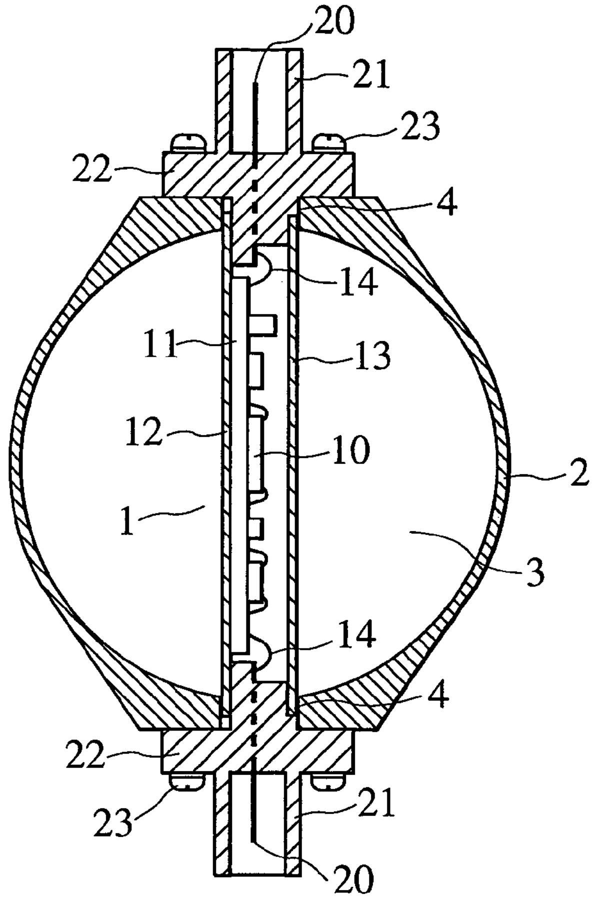
FIG. 9 is a cross-sectional view of an engine control unit according to a fourth embodiment of the invention.

FIG. 9 is a schematic view of an ECU according to a fourth embodiment of the invention. According to the fourth embodiment, an intake pipe 2 is provided with through holes 4 on both sides thereof, thereby extending the length of a circuit board 11 in a diametric direction of the intake pipe and making a connector portion 21 protrude into either of both through holes.

According to the fourth embodiment, a fixing flange 22 provided on the connector portion 21 is secured to the intake pipe on either of both sides of the intake pipe, which eliminates the need for providing a fixing rail inside the intake pipe for securing an end opposite to the connector portion 21 of the ECU. It also allows the circuit board area to be made large, which in turns allows a multifunctional ECU having a large number of input and output points to be disposed inside the intake pipe in the same way as in the third embodiment of the invention.

Figure 10:
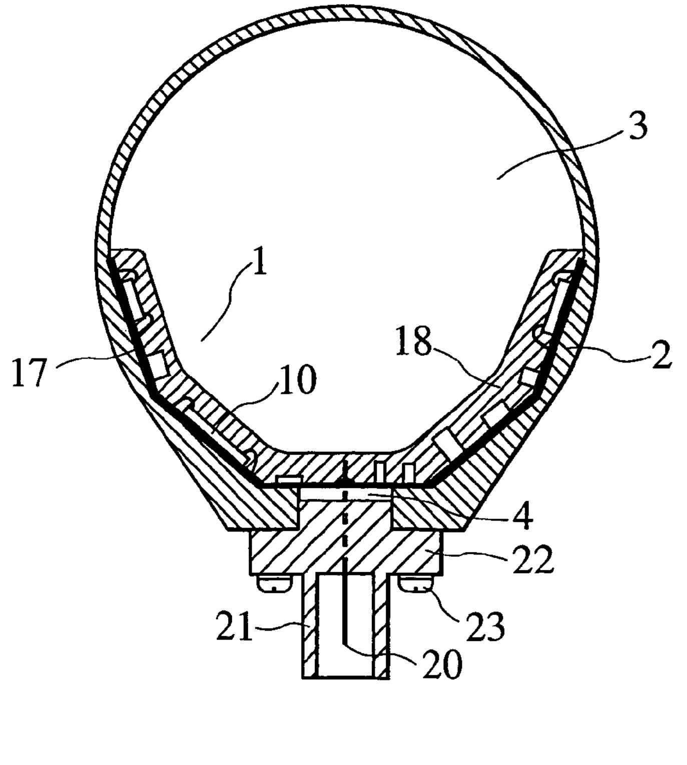
FIG. 10 is a cross-sectional view of an engine electronic control unit according to a fifth embodiment of the invention.

FIG. 10 is a schematic view of an ECU according to a fifth embodiment of the invention. The ECU according to the fifth embodiment has a configuration in which a circuit board 10 is mounted on, for example, a flexible board 17 and the flexible board 17 is secured to an inner wall of an intake pipe 2 in tight contact therewith.

A gel material 18 is used to protect the circuit components 10 on the flexible board 17 from oil, gasoline, and other contaminants and moisture. As explained in the first embodiment of the invention or the like, a connector portion 21 of the ECU 1 is protruded to the outside of the intake pipe 2 through a through hole 4 provided in the intake pipe 2 and fixedly screwed to the intake pipe 2 at a fixing flange 22 of the connector portion 21.

According to the fifth embodiment of the invention, the flexible board on which circuit components are mounted is brought into direct tight contact with the inner wall of the intake pipe, which eliminates the need for the fixing rail inside the intake pipe, used for securing the end opposite to the connector portion of the ECU. It also eliminates the need for the metal base, the metal cover, and the screws or the like used for fastening the metal cover to the metal base. This contributes to a substantial reduction in the number of parts used. In addition, because of the structure in which the ECU is not inserted in the intake air passage, it is possible to reduce intake air resistance. The ECU according to the fifth embodiment does not share the structure found in the first to fourth embodiments explained in the foregoing descriptions, in which heat is dissipated to the intake air from both sides of the ECU; however, enlarging the board area does not increase the intake air resistance and it is possible to maintain a sufficient heat radiation performance by making the board area large and disposing heat generating components sporadically, thereby making a heat generating density small.

If a high thermal conductivity resin, which is a mixture of a metallic or inorganic ceramics filler having a high thermal conductivity with a resin having itself a high thermal conductivity, is used, instead of the gel material used in the fifth embodiment, the engine ECU will exhibit even more excellent heat radiation performance. For the resin having itself a high thermal conductivity, one having in a resin component thereof an anisotropic structure may be used. It is particularly desirable that each of anisotropic structure units making up the anisotropic structure have a covalent bond portion, the maximum diameter value of the anisotropic structure unit be 400 nm or more, and anisotropic structures contained in resin components account for 25 vol % or more.

An example of such a resin is one that uses 4-(oxilanylmethoxy) benzoic acid-4,4'-[1,8-octane-diyl-bis (oxy)] bisphenol-ester as an epoxy resin monomer and 4,4'-diaminodiphenylmethane as an epoxy resin hardener.

Figure 11:
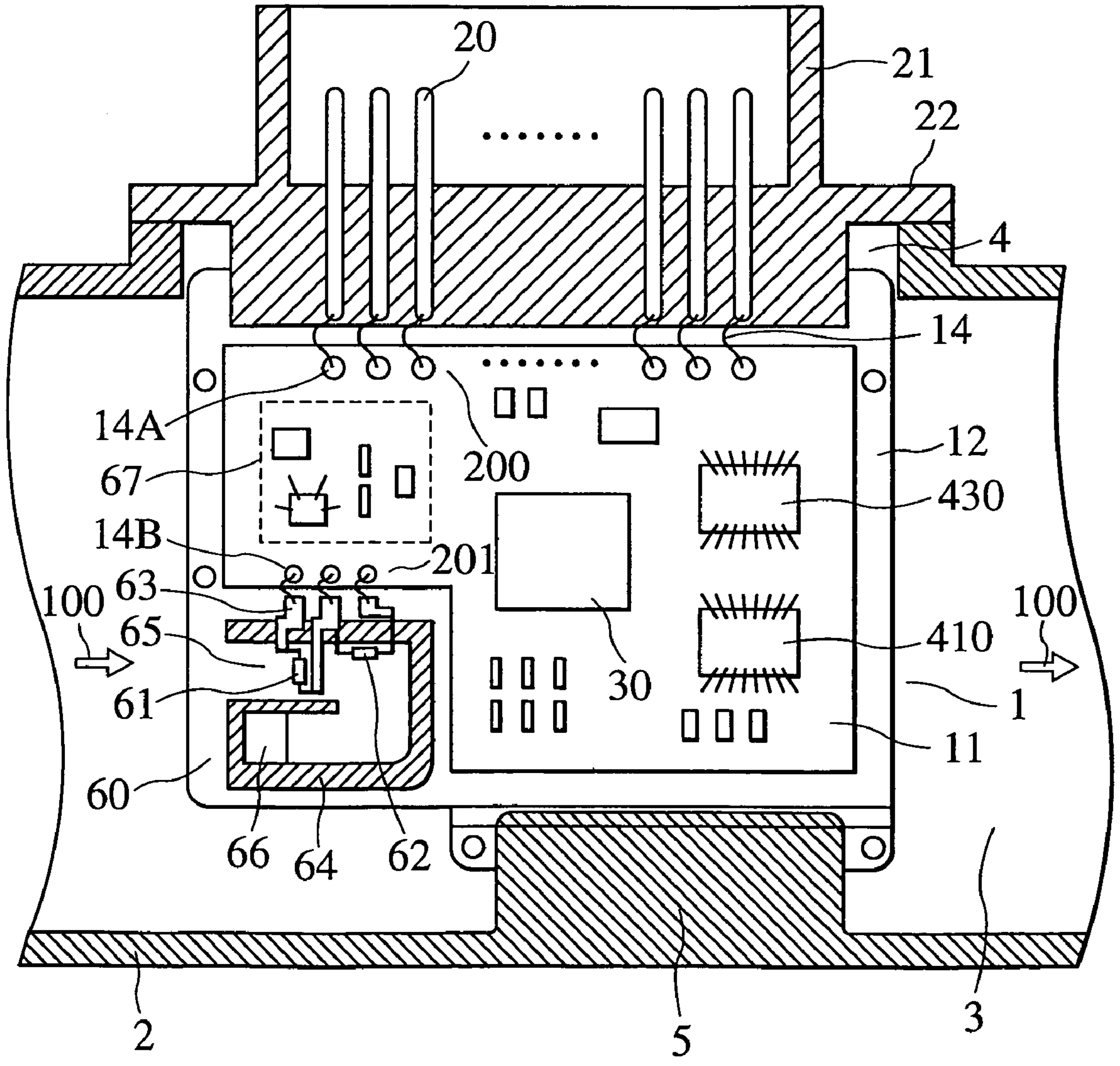
FIG. 11 is a cross-sectional view of an engine electronic control unit according to a sixth embodiment of the invention.

FIG. 11 is a schematic view of an engine ECU provided with an intake air flow rate measuring device according to a sixth embodiment of the invention. FIG. 11 is a cross-sectional view showing the engine ECU provided with the intake air flow rate measuring device taken in a longitudinal direction of the intake pipe.

The intake air flow rate measuring device 60 is mounted on a metal base 12 of the ECU 1, together with a circuit board 11 on which circuit components constituting the ECU 1 are mounted. The intake air flow rate measuring device 60 uses a heat generating resistor element 61 for measuring the flow rate and a temperature sensing resistor element 62 for detecting the temperature provided in a housing 64 made of resin to measure the air flow rate and intake air temperature in the intake air passage 3. The method employed by the intake air flow rate measuring device for measuring the air flow rate is known and the details thereof will be herein omitted. An output signal from the intake air flow rate measuring device 60 is sent from a supporting terminal 63 by way of a measuring circuit 67 of the intake air flow rate measuring device 60 to a microprocessor 30 of the ECU 1. A measuring circuit 67 of the intake air flow rate measuring device 60 includes a control circuit for keeping constant the difference in temperature between the heating temperature of a heat generating resistor element 61 and the intake air temperature. The microprocessor 30 of the ECU 1 computes an optimum fuel injection amount based on the signal provided by the intake air flow rate measuring device 60 and, by means of an output driver LSI 410, drives an injector not shown. According to the sixth embodiment, the housing 64 is formed into a U-shaped passage, thus guiding the intake air 100 flowing through the inside of an intake air passage 3 from a flow path 65 toward an outlet opening face 66. The construction of the ECU 1, the method of mounting the ECU 1 on an intake pipe 2 through a fixing rail 5 and the like are as explained in the first embodiment of the invention. According to the sixth embodiment of the invention, the engine ECU described in the first embodiment of the invention is used as the ECU 1. It is nonetheless possible to use the ECU according to other embodiments.

According to the sixth embodiment, the ECU 1 is integrated with the intake air flow rate measuring device 60, which eliminates the need for the metal base, the connector portion, and the mounting portion for mounting it to the intake pipe for the exclusive use for the intake air flow rate measuring device 60, and a harness or the like for sending output signals to the ECU. This allows a low-cost, compact air intake system to be configured. Other effects including the enhanced heat radiation efficiency and the like of the ECU are as explained in detail in the first embodiment of the invention.

Figure 12:
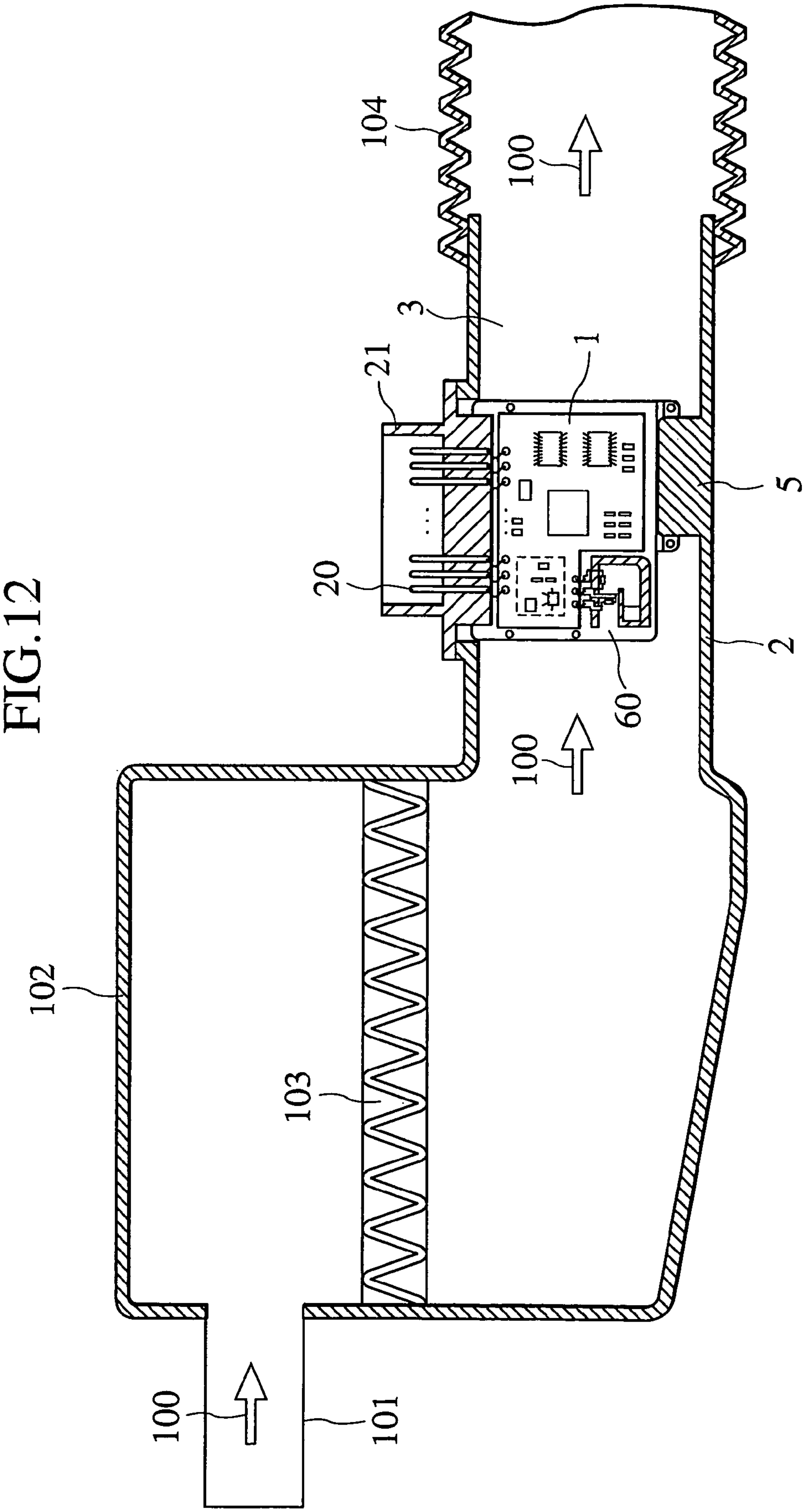
FIG. 12 is a schematic diagram showing an engine air intake system in which the engine electronic control unit according to the sixth embodiment is mounted.

FIG. 12 shows a configuration in which the ECU provided with the intake air flow rate measuring device according to the sixth embodiment of the invention is mounted to an engine air intake system.

Referring to FIG. 12, the engine air intake system includes an air cleaner housing 102, the ECU 1 on which an intake air flow rate measuring device 60 is mounted, and an intake duct 104. The air cleaner housing 102 includes a fresh air intake port 101 through which fresh air is admitted and a filter 103 that removes dust and dirt from the air. The ECU 1 provided with the intake air flow rate measuring device 60 is mounted to the air intake system by inserting it through a through hole provided in the intake pipe 2 located at a position downstream the air cleaner housing 102 into an intake air passage 3 and securing a fixing flange 22 to the intake pipe 2.

Figure 13:
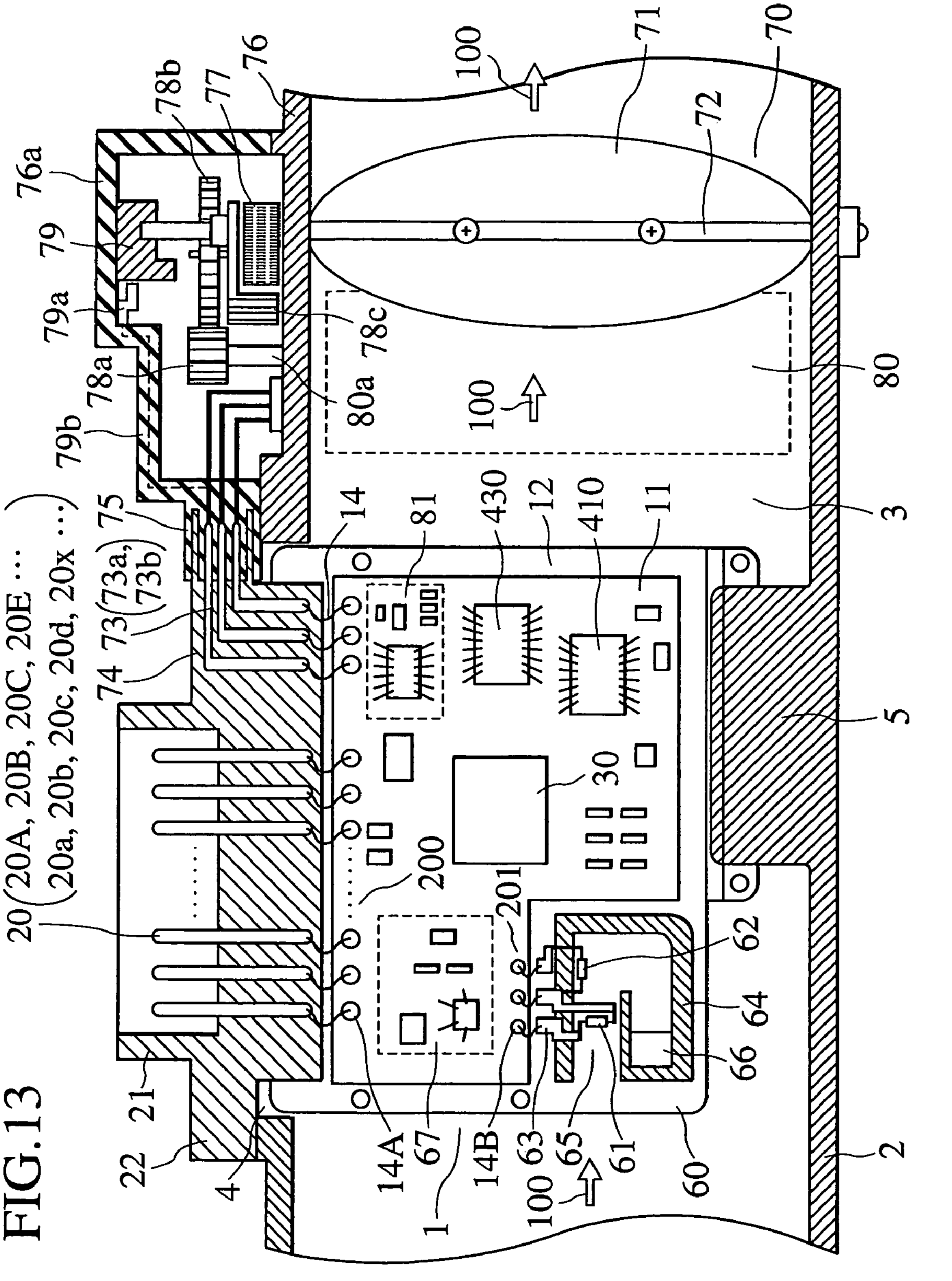
FIG. 13 is a cross-sectional view of an engine control unit according to a seventh embodiment of the invention, which is provided with an intake air flow rate measuring device and an electronic control throttle module.

FIG. 13 is a schematic view of an ECU provided with an intake air flow rate measuring device and an electronic control throttle module according to a seventh embodiment of the invention. FIG. 13 is a cross-sectional view of the ECU provided with the intake air flow rate measuring device and the electronic control throttle module taken in a longitudinal direction of the intake pipe.

The electronic control throttle module 70 electrically controls the amount of air supplied to each of engine cylinders according to the amount of an accelerator pedal not shown depressed. This module includes a throttle valve 71 fixed to a throttle shaft 72, a DC motor 80 and a gear train 78 that turn the throttle shaft 72, a spring 77 that maintains the throttle valve 71 at a predetermined opening when there is no output provided from the DC motor 80, and a throttle valve opening sensor 79 that measures the opening of the throttle valve 71 from a position of the throttle shaft 72. The spring 77, the gear train 78, the throttle valve opening sensor 79, and the DC motor 80 are housed in a throttle body 76 that is formed integrally with the intake pipe 2.

According to the seventh embodiment of the invention, an electronic control throttle module control circuit 81 is mounted on the circuit board 11 of the ECU 1. The electronic control throttle module control circuit 81 comprises an input interface circuit that provides the microprocessor 30 with inputs of signals from the throttle valve opening sensor 79 and a driver circuit that drives the DC motor 80. An electrical connection between the ECU 1 and the electronic control throttle module 70 is established through insertion of a connector terminal 73 of a connector portion 74 provided in the ECU 1 for connection to the electronic control throttle module 70 into a connector portion 75 provided in the electronic control throttle module 70 for connection to the ECU 1. In addition, the circuit board 11 on the engine ECU 1 inserted in the intake pipe 2 is disposed so as to run parallel with the throttle shaft 72 in order to reduce intake air resistance in the intake air passage 3.

As explained in the sixth embodiment of the invention, the intake air flow rate measuring device 60 is also mounted on the metal base 12 of the ECU 1, together with the circuit board 11 on which circuit components constituting the ECU 1 are mounted, according to the seventh embodiment. The use of such a configuration allows the air intake module that electrically controls the amount of air supplied to each of the engine cylinders according to the amount of the accelerator pedal not shown depressed and measures the flow rate of the air flowing at this time in the intake air passage to be integrally formed.

According to the seventh embodiment, the ECU described in the first embodiment is used as the ECU 1. It is nonetheless possible to use the ECU according to other embodiments.

Configuring an air intake module such as that described in the seventh embodiment by integrating the ECU 1 with the intake air flow rate measuring device 60 and the electronic control throttle module 70 eliminates the need for the metal base, the connector portion, and the mounting portion for mounting to the intake pipe for the exclusive use for the intake air flow rate measuring device 60, and a harness or the like for sending output signals to the ECU, and a harness or the like placed between the ECU and the electronic control throttle module. This allows a low-cost and compact air intake system to be configured. Furthermore, the use of such an air intake module simplifies processes of testing, matching and the like of the engine intake system. The effects of the air intake module that integrates the ECU with the intake air flow rate measuring device and the electronic control throttle module as described in the foregoing are known. Nonetheless, according to the sixth embodiment, the specific arrangement of building the ECU as the air intake module inserted in the intake pipe makes it possible to build an even more compact air intake system and enhance ECU heat radiation efficiency even further.

Figure 14:
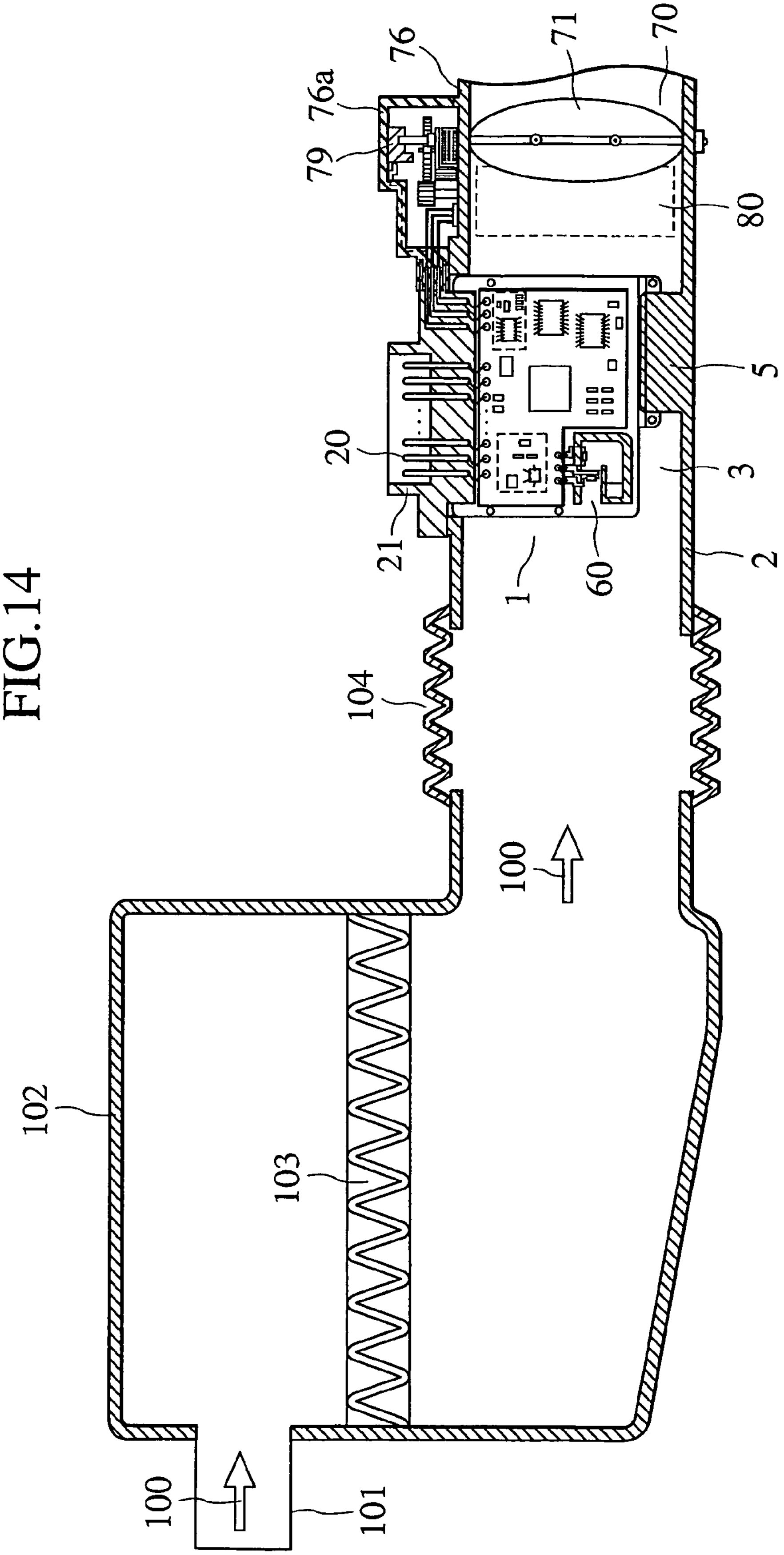
FIG. 14 is a schematic diagram showing an engine air intake system, in which the engine electronic control unit according to the seventh embodiment is mounted.

FIG. 14 shows a configuration in which an ECU provided with an intake air flow rate measuring device and an electronic control throttle module according to a seventh embodiment of the invention is mounted to an engine air intake system.

Referring to FIG. 14, an engine air intake system includes an air cleaner housing 102, the ECU 1 on which the intake air flow rate measuring device 60 is mounted and the electronic control throttle module 70, and an intake duct 104. The air cleaner housing 102 includes a fresh air intake port 101 through which fresh air is admitted and a filter 103 that removes dust and dirt from the air. The ECU 1 provided with the intake air flow rate measuring device 60 and the electronic control throttle module 70 is mounted to the air intake system by inserting it through the through hole provided in an intake pipe 2 located at a position downstream an intake duct 104 into an intake air passage 3 and securing it to the intake pipe 2.

Features of additional embodiments according to the invention will be explained below.

Referring to FIG. 13, the throttle body 76 is composed of two portions, one to which the ECU 1 is mounted and the other to which the throttle valve 71 is mounted. In this embodiment, the intake pipe 2 provides a single body common to both of these two portions.

The intake pipe 2 is provided with the through hole 4 into which the ECU 1 is inserted at a position on the upstream side of the throttle valve 71. This through hole 4 extends in the direction along the flow of air.

The connector 21 of the ECU 1 is formed into a slender shape so that a dimension thereof in the direction along the flow of air is longer than the dimension perpendicular thereto or in a circumferential direction thereto so as to plug the through hole 4.

A plurality of electric terminals 20 molded in the connector 21 is therefore disposed along the direction of the flow of air as shown in FIG. 13. The plurality of electric terminals 20 includes a terminal 20E, to which a signal from the accelerator sensor 51 is applied, a terminal 20A, to which signals from the crank angle sensor 52 (an engine speed signal and a cylinder identifying signal) are applied, a terminal 20B, to which a signal from the detonation sensor 54 is applied, and a terminal 20C, to which a signal from the oxygen sensor 54 that detects concentration of oxygen in exhaust gases is applied. The terminal, to which a signal from the throttle opening sensor 79 is applied, is formed in a terminal 73*a* of a connector 74 to be described later.

In addition, the electric terminals 20 molded in the connector 21 include a terminal 20*a* that provides an output of a driving current to the injector 55, a terminal 20*b* that provides an output of an ignition signal to the igniter 56, a terminal 20*c* that provides an output of a driving current to the fuel pump 57, and a terminal 20*d* that supplies a driving current to the warning lamp 58 provided in an instrument panel. The output terminal that provides an output of a driving current to the DC motor 80 for driving the throttle valve 71 is formed in a terminal 73*b* of the connector 74 to be described later.

Though not shown in FIG. 13, other two to four rows of electric terminals of the same kind running in parallel with each other are formed in a direction perpendicular to the figure.

The connector 74 is formed in the connector 21 to establish an electrical connection with the DC motor 80 that drives the electronic control throttle module 70 and the throttle opening sensor 79 both disposed on the downstream side. According to this embodiment, the connector 21 is open in the direction perpendicular to the flow of air, while the connector 74 is open in the downstream direction along the flow of air.

The electric terminals 20 of the connector 21 and the electric terminals 73 of the connector 74 are molded by a resin material forming the connectors.

Ends of the electric terminals 20, 73 on a side of the intake air passage are aligned so as to be opposed to one side of the control circuit board 11 bonded to the metal base 12 using adhesive. A plurality of metal wires 14 are extended from the ends across to a plurality of pads 14A on the side of the control circuit board 11 and the wire bonding connection 200 is formed through automatic wire bonding. This configuration produces an effect of automating connection of terminals.

Each of the plurality of pads 14A is connected to a corresponding electric element on the control circuit board through printed wiring.

The electronic control throttle module 70 is provided with the DC motor 80 mounted to the intake pipe 2. A motor shaft 80*a* of the DC motor 80 is disposed in parallel with the throttle shaft 72 of the throttle valve 71.

An output gear 78*a* is secured to one end of the motor shaft 80*a*. Rotation of the motor shaft 80*a* is transmitted to a larger diameter gear of an intermediate gear 78*b* and, by way of an intermediate gear (not shown) formed coaxially, to a sector final reduction gear 78*c* secured to one end of the throttle shaft 72. A motor speed is reduced to about 1/25 through these gear trains, thereby turning the throttle valve 71 from a fully closed position through about 90 degrees to a fully open position. The spring 77 urges the throttle valve 71 in a closing direction over a range from the fully open position to a default position (a standby driving position) and in an opening direction over a range from the fully closed position to the default position (the standby driving position).

The gear train 78 is covered by a resin cover 76*a*, on which the throttle opening sensor 79 is mounted. The end of the throttle shaft 72 extends up to the position of the throttle opening sensor 79 and a rotational displacement of the throttle shaft 72 is detected by the throttle opening sensor 79 electrically or magnetically.

The detected signal is relayed by way of an electric terminal of the throttle opening sensor 79, an electric conductor terminal molded in the gear cover 76*a*, and an electric conductor 79*b* molded across a portion from a joint 79*a* to the gear cover 76*a*, thus reaching an electric terminal formed at a part of the connector 75 of the gear cover 76*a*.

The connector 75 is formed integrally with the gear cover 76*a*.

An electrical connection is made between the connector 74 on the ECU 1 side and the connector 75 on the electronic control throttle module side through mutual insertion connection therebetween.

The electronic control throttle module control circuit 81 of the engine ECU 1 performs arithmetic operations for the driving current to the DC motor 80 and a result thereof is sent through these connectors to the DC motor 80.

More specifically, in the engine ECU 1, the microprocessor 30 performs arithmetic operations of a target throttle valve opening based on the signal fed by the accelerator opening sensor by way of any of the electric terminals 20 of the connector 21 and sends the result to the electronic control throttle module control circuit 81. The electronic control throttle module control circuit 81 provides a feedback control of the driving current to the DC motor 80 so as to minimize a deviation of an actual opening of the throttle valve 71, as interpreted from data sent from the throttle opening sensor 79 of the electronic control throttle module 70, from the target opening command sent from the microprocessor 30.

The intake air flow rate measuring device 60 is mounted on the metal base 12 at a position upstream with respect to the flow of air.

The flow path 65 for the air to be measured is formed in the housing 64 formed by a resin molding. The housing 64 is located at a position, at which part of the control circuit board 11 is cut out, and directly secured to the metal base 12.

The heat generating resistor element 61 and the temperature sensing resistor element 62 are secured to the housing 64 of the resin molding. They are disposed in the order of the heat generating resistor element 61 and the temperature sensing resistor element 62, looking them from the upstream side in the flow path 65.

The supporting terminals 63 functioning as electric terminals connected to the resistor elements 61, 62 protrude toward the side of the control circuit board 11 from the housing 64. The supporting terminals 63 are connected electrically to pads 14B provided on the side of the control circuit board 11 through the wire bonding connection 201.

The intake air flow rate measuring device 60 is mounted upstream from the output driver 41, the power supply circuit 43, and the electronic control throttle module control circuit 81 provided on the control circuit board 11.

An accurate mass flow rate cannot be obtained if measurement is taken by allowing air heated by heat generated by these control circuit elements (41, 43, 81) into the flow path 65.

It is not possible, either, to measure an accurate amount of intake air if the heat generated by these control circuit elements (41, 43, 81) is transmitted via the metal base 12 to the intake air flow rate measuring device 60.

In the arrangement according to this embodiment of the invention, an effect is produced to curb influence from heat generated by the control circuit elements as described above on measurement of the amount of air.

The arrangement is also characterized in that the microprocessor 30 is located at the center of the control circuit board 11, with the intake air flow rate measuring device 60 and an output processing circuit thereof being disposed on the upstream side from the microprocessor 30, and the output driver 41, the power supply circuit 43, and the electronic control throttle module control circuit 81 being disposed on the downstream side from the microprocessor 30, and pads 14A are lined up on one side on the side of the connector. This eliminates waste and is thus preferable in terms both of a wiring layout and a space for element placement.

Figure 4:
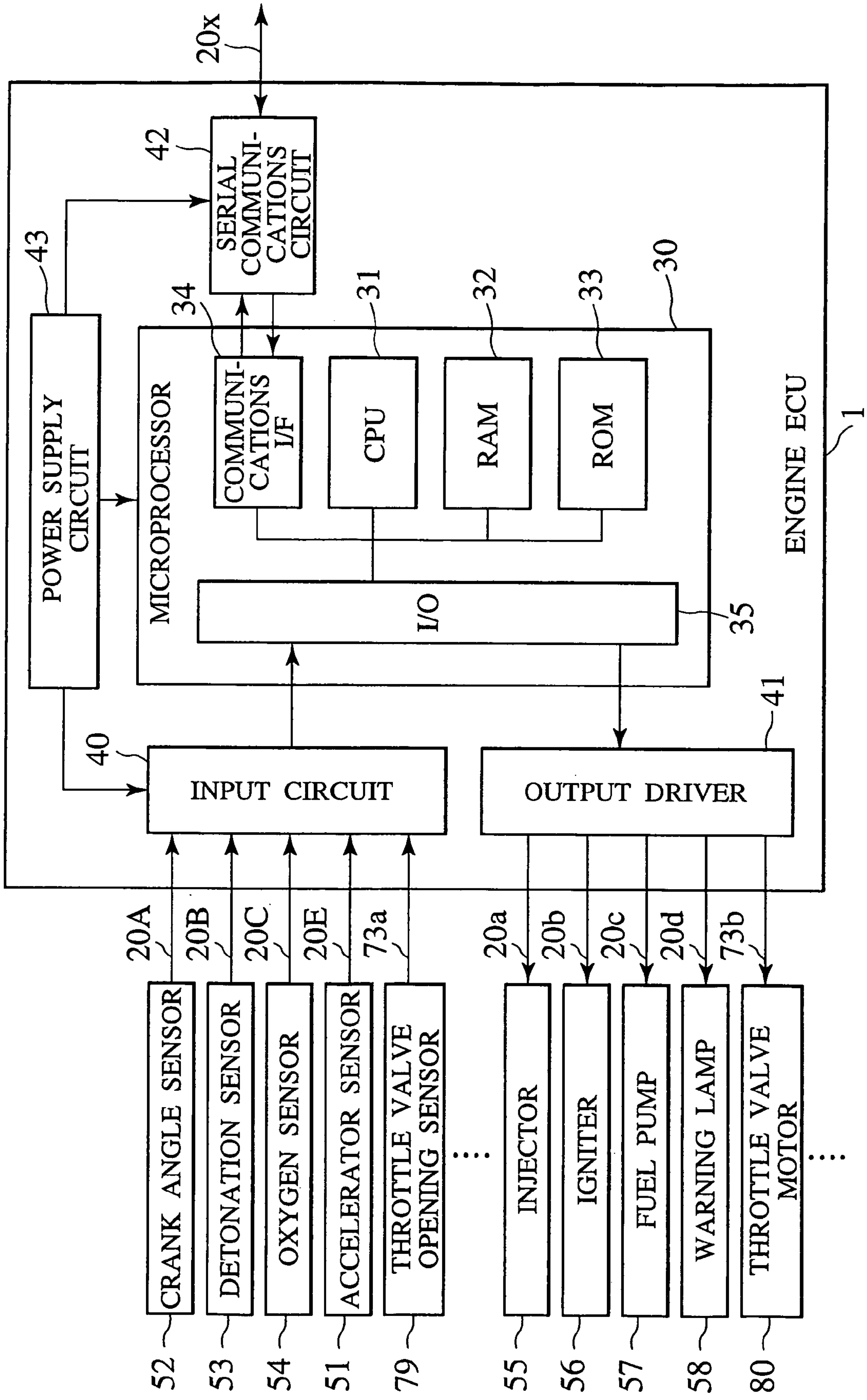
FIG. 4 is a circuit block diagram of the engine control unit according to the first embodiment of the invention shown in FIG. 1.

In FIG. 6, Out1 to n are connected to the respective loads 98 as the electric loads shown in FIG. 4, (though the symbol for solenoid is typically given to every load in FIG. 6).

In the embodiment depicted in FIG. 6, signals are transmitted and received through serial communications with external diagnostics devices by way of the serial communication control portion 97.

Developing this idea further, it is possible to exchange signals with a communications control circuit provided in another external control module, instead of directly inputting sensor signals to the electric terminals 20 of the connector 21 of the ECU1 or directly outputting a driving current to an electric load.

Also in the embodiment, a connection for data transmission and reception is established with a control unit of an automatic transmission. A gear position data is read by the microprocessor 30 through communications for use in arithmetic operations of the fuel injection amount, the ignition timing, and the throttle opening signal.

On the other hand, the engine control fuel injection data, ignition data, or the throttle opening data computed by the microprocessor, or the data read by the ECU 1 from the crank angle sensor or the throttle opening sensor is transmitted to the control unit of the automatic transmission by way of the serial communication control portion 97.

According to the embodiment, since the signal from the throttle opening sensor 79 is read by the ECU 1 through short signal lines (79*b*, 73), it is less likely that the signal picks up electromagnetic interference in the middle of the signal lines, which makes significant the effect of mounting the ECU 1 in the intake pipe 2.

If a non-contact type Hall IC sensor is used for the throttle opening sensor 79, the following method has been developed. That is to say, a data signal is converted to a corresponding digital signal in the Hall IC of the sensor before being subjected to temperature compensation and zero span adjustment. The resultant digital signal is again converted to an analog signal which is output and the microprocessor translates it back again to a digital signal. Because of a number of signal conversion processes involved in this method, it takes time for the signal to be fed to the microprocessor, thus resulting in a control lag.

If the signal line is short and the signal is less susceptible to influence from temperature and electromagnetic interference thanks to the arrangement according to the embodiment, the signal can then be directly transmitted from the Hall element or sent in a form of an amplified analog signal to the microprocessor and the microprocessor can make temperature compensation and zero span adjustments through processing of data in a digital form. This eliminates the problem of the delayed signal input from the Hall element, thus solving the control lag problem.

According to the embodiment, it is possible to realize an ECU or a control circuit module that offers an outstanding heat radiation performance without increasing intake air resistance in the intake air passage by a large amount.

In addition, the use of such an ECU or a control circuit module allows an engine air intake system that offers a great ease of assembly or an intake air passage body.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A control circuit module mounted in an intake air passage, comprising:

a resin molding connector portion secured to the intake air passage; and a control circuit board secured on a metal plate disposed in the intake air passage;

wherein the metal plate is formed to extend in a direction along an air flow, being longer than a length, in a radial or circumferential direction, of the intake air passage, the resin molding connector portion is formed long, narrow along a longitudinal direction of the metal plate, a plurality of electric terminals disposed in proper alignment are molded inside the resin molding connector portion, and an electric connection portion for connection between the electric terminals and the control circuit board is centralized at a joint between the metal plate and the resin molding connector portion, wherein the resin molding connector portion includes at least two portions that are open to different directions.

2. An engine electronic control device, comprising:

a circuit board on which a microprocessor for controlling an engine of an vehicle, and circuit components of peripheral circuits of the microprocessor including an input/output interface circuit, an output driver circuit, and a power supply circuit are mounted, wherein the circuit board is mounted in an intake air passage of an intake system that supplies each of engine cylinders with air by inserting the circuit board in a direction substantially perpendicularly with respect to a plane of the intake air passage forming the intake air passage.

3. The engine electronic control device according to claim 2, wherein a connector portion for connection to harnesses from various types of engine components is protruded to the outside of the intake air passage and the connector portion is secured to a member that forms part of the intake air passage.

4. The engine electronic control device according to claim 2, wherein the engine electronic control device is secured to a member that forms part of the intake air passage located at an end on a side of the intake air passage different from that on which the connector portion is formed.

5. The engine electronic control device according to claim 2, wherein the circuit board is secured to a metallic member in tight contact therewith.

6. The engine electronic control device according to claim 5, wherein the circuit board is covered with a metallic cover and the metallic cover is secured to the metallic member in tight contact therewith so as to seal the inside of the engine electronic control device.

7. The engine electronic control device according to claim 6, wherein a circuit board on which circuit components are mounted is secured also to the metallic cover in tight contact therewith, in addition to the metallic member to which the circuit board is secured, and the circuit board on the metallic member is electrically connected to the circuit board on the metallic cover.

8. The engine electronic control device according to claim 7, wherein the circuit board mounted on the metallic member in tight contact therewith is divided into two, the two circuit boards are disposed so that circuit board sides thereof are opposed to each other, and a first circuit board on one metallic member is electrically connected to a second circuit board on the other metallic member.

9. The engine electronic control device according to claim 5, wherein the circuit board is sealed with resin molding.

10. The engine electronic control device according to claim 9, wherein the resin used for the resin molding is a high thermal conductivity resin that is made by mixing a metallic or inorganic ceramics filler with a resin having a high thermal conductivity and anisotropic structures contained in resin components thereof.

11. The engine electronic control device according to claim 2, wherein at least one circuit out of the input/output interface circuit, the output driver circuit, and the power supply circuit is formed using an LSI chip on the circuit board.

12. An engine ECU, comprising:

a circuit board on which a microprocessor for controlling an engine of a vehicle, and circuit components of peripheral circuits of the microprocessor including an input/output interface circuit, an output driver circuit, and a power supply circuit are mounted, wherein the circuit board is disposed so as to be secured to an intake air passage, in tight contact therewith, of an intake system that supplies each of engine cylinders with air, and a connector portion for connection to harnesses from various types of engine components is protruded to the outside of the intake air passage and the connector portion is secured to a member that forms part of the intake air passage.

13. The engine electronic control device according to claim 12, wherein the circuit board is molded by a high thermal conductivity resin that is made by mixing a metallic or inorganic ceramics filler with a resin having a high thermal conductivity and anisotropic structures contained in resin components thereof.

14. The engine electronic control device according to claim 13, wherein the engine electronic control device is secured to a member that forms part of the intake air passage located at an end on a side of the intake air passage different from that on which the connector portion is formed.

15. The engine electronic control device according to claim 13, wherein the circuit board is secured to a metallic member in tight contact therewith.

16. The engine electronic control device according to claim 12, wherein the engine electronic control device is integrated with an intake air flow rate measuring device that measures a flow rate of air flowing through the intake air passage.

17. The engine electronic control device according to claim 12, wherein the engine electronic control device is integrated with an electronic control throttle module that electronically controls a flow rate of air flowing through the intake air passage.

18. The engine electronic control device according to claim 12, wherein a communications circuit is provided on the circuit board.

19. An engine air intake system, wherein the engine electronic control device according to claim 12 is provided.

20. An engine ECU according to claim 12, wherein the engine electronic control device is integrated with an intake air flow rate measuring device that measures a flow rate of air flowing through the intake air passage.

21. An engine ECU according to claim 12, wherein the engine electronic control device is integrated with an electronic control throttle module that electronically controls a flow rate of air flowing through the intake air passage.

22. An engine ECU according to claim 12, wherein a communications circuit is provided on the circuit board.

* * * * *